(12) United States Patent
Li et al.

(10) Patent No.: US 9,859,998 B2
(45) Date of Patent: Jan. 2, 2018

(54) APPARATUS AND METHOD FOR IDENTIFYING AND LOCALIZING VEHICLE OCCUPANT AND ON-DEMAND PERSONALIZATION

(71) Applicant: Samsung Electronics Co., Ltd., Gyeonggi-do (KR)

(72) Inventors: Zhiyun Li, Kenmore, WA (US); Pei Zheng, Sammamish, WA (US); Jiaming Liu, Issaquah, WA (US); Jae Young Lee, Bellevue, WA (US); Daping Guo, Bellevue, WA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 14/831,490

(22) Filed: Aug. 20, 2015

(65) Prior Publication Data
US 2017/0052538 A1 Feb. 23, 2017

(51) Int. Cl.
*G06Q 20/10* (2012.01)
*H04B 17/318* (2015.01)
(Continued)

(52) U.S. Cl.
CPC ........... *H04B 17/318* (2015.01); *B60N 2/002* (2013.01); *B60N 2/0248* (2013.01); *G07C 5/008* (2013.01);
(Continued)

(58) Field of Classification Search
None
See application file for complete search history.

(56) References Cited

U.S. PATENT DOCUMENTS 5,474,327 A * 12/1995 Schousek .......... B60R 21/01556
180/268
5,890,085 A 3/1999 Corrado et al.
(Continued)

FOREIGN PATENT DOCUMENTS

WO 2014144760 A1 9/2014

OTHER PUBLICATIONS

European Patent Office, "European Search Report," Application No. 16170273.3, Oct. 16, 2014, 8 pages, publisher EPO, Munich, Germany.
(Continued)

*Primary Examiner* — Truc M Do

(57) ABSTRACT

A wireless mobile device for personalizing the control and IVI settings of a connected vehicle according to a seat position of a user of the mobile device. The wireless mobile device is configured to: i) receive a radio signal from each of a plurality of beacons in the vehicle; ii) determine a received signal strength indicator (RSSI) value for each received radio signal; iii) apply a seat prediction model M to the RSSI value for each received radio signal to predict a seat position P; and iv) transmit a predicted seat position P to a server. The seat prediction model M is generated by a machine learning process and stored in a server. A beacon array configuration, data collection and generalization procedure optimizes the coverage and accuracy of the model M. The wireless mobile device is further configured to receive an identification (ID) value of the vehicle. The wireless mobile device retrieves the seat prediction model M from the server and caches in memory in the wireless mobile device. Once the vehicle knows the in-vehicle seat position of a user, on-demand personalization will follow automatically. The personalization can be for vehicle controls, IVI
(Continued)

head unit or backseat entertainment system, etc., according to user's in-vehicle seat position.

24 Claims, 5 Drawing Sheets

(51) Int. Cl.
*G07C 5/00* (2006.01)
*G07C 5/08* (2006.01)
*B60N 2/00* (2006.01)
*H04W 4/04* (2009.01)
*B60N 2/02* (2006.01)
*H04B 17/391* (2015.01)

(52) U.S. Cl.
CPC ......... *G07C 5/085* (2013.01); *H04B 17/3913* (2015.01); *H04W 4/046* (2013.01)

(56) References Cited

U.S. PATENT DOCUMENTS

| | | | |
|---|---|---|---|
| 6,026,340 A * | 2/2000 | Corrado | B60N 2/002 280/735 |
| 6,753,780 B2 * | 6/2004 | Li | B60N 2/002 180/271 |
| 8,917,174 B2 * | 12/2014 | Morgan, Jr. | H04W 4/046 340/425.5 |
| 2010/0167771 A1 * | 7/2010 | Raghothaman | H04B 17/318 455/501 |
| 2011/0195699 A1 * | 8/2011 | Tadayon | H04B 5/0062 455/418 |
| 2012/0115512 A1 * | 5/2012 | Grainger | G01S 5/0257 455/456.3 |
| 2012/0122476 A1 * | 5/2012 | Lee | H04W 4/02 455/456.1 |
| 2013/0003572 A1 * | 1/2013 | Kim | H04W 64/00 370/252 |
| 2013/0030645 A1 * | 1/2013 | Divine | B60K 35/00 701/36 |
| 2013/0145065 A1 * | 6/2013 | Ricci | G06F 9/54 710/241 |
| 2013/0336094 A1 * | 12/2013 | Gruteser | G01S 11/14 367/117 |
| 2014/0277935 A1 * | 9/2014 | Daman | G08G 1/127 701/36 |
| 2014/0297220 A1 * | 10/2014 | Raffa | B60N 2/002 702/150 |
| 2015/0149042 A1 * | 5/2015 | Cooper | B60R 16/037 701/48 |
| 2015/0256668 A1 * | 9/2015 | Atkinson | H04M 1/6075 455/418 |

OTHER PUBLICATIONS

Hon Chu, Vijay Raman, and Jeffreyshen of Duke University; Aman Kansal and Victor Bahl of Microsoft Research; and Romit Roy Choudhury of University of Illinois; "I am a Smartphone and I Know My User is Driving"; pp. 1-8.

* cited by examiner

FIGURE 2
FIGURE 4
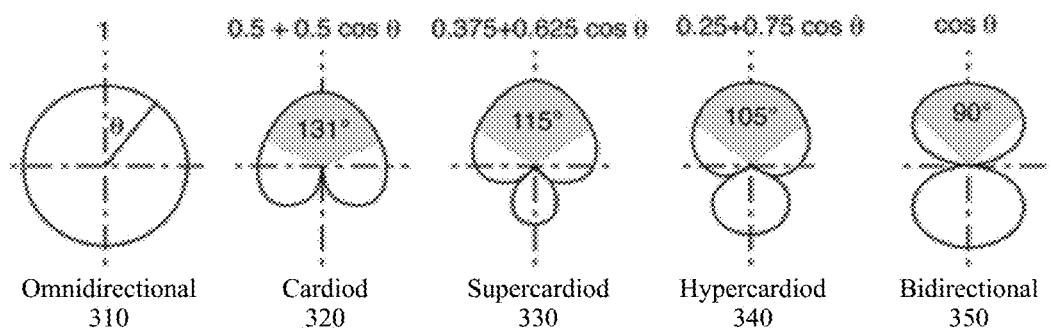
FIGURE 3

| Seat | BLEB1 | BLEB2 | BLEB3 | BLEB4 | BLEB5 | BLEB6 | BLEB7 | BLEB8 |
|------|-------|-------|-------|-------|-------|-------|-------|-------|
| FL   | -50 dB| -48 dB| -71 dB| -90 dB| -55 dB| -72 dB| -70 dB| -68 dB|

500

| Seat | BLEB1 | BLEB2 | BLEB3 | BLEB4 | BLEB5 | BLEB6 | BLEB7 | BLEB8 |
|------|-------|-------|-------|-------|-------|-------|-------|-------|
| FL   | -50 dB| -48 dB| -71 dB| -90 dB| -55 dB| -72 dB| -70 dB| -68 dB|
| FL   |       |       |       |       |       |       |       |       |
| FL   |       |       |       |       |       |       |       |       |
| FL   |       |       |       |       |       |       |       |       |
| FR   |       |       |       |       |       |       |       |       |
| FR   |       |       |       |       |       |       |       |       |
| FR   |       |       |       |       |       |       |       |       |
| FR   |       |       |       |       |       |       |       |       |
| RL   |       |       |       |       |       |       |       |       |
| RL   |       |       |       |       |       |       |       |       |
| RL   |       |       |       |       |       |       |       |       |
| RL   |       |       |       |       |       |       |       |       |
| RR   |       |       |       |       |       |       |       |       |
| RR   |       |       |       |       |       |       |       |       |
| RR   |       |       |       |       |       |       |       |       |
| RR   |       |       |       |       |       |       |       |       |

600

APPARATUS AND METHOD FOR IDENTIFYING AND LOCALIZING VEHICLE OCCUPANT AND ON-DEMAND PERSONALIZATION

TECHNICAL FIELD

The present application relates generally to in-vehicle infotainment (IVI) systems, more specifically, to an IVI system that detects seat localization for each occupant and provides on-demand personalization.

BACKGROUND

In-vehicle infotainment (IVI) systems are becoming ubiquitous. A driver can listen to music, news, and other audio content from the IVI head unit. In addition, a driver can personalize the IVI head unit for favorite content, navigation history, or vehicle telematics, and the like. Some IVI systems include additional entertainment system for each passenger, such as on the seat back, the roof, or the like. A passenger can even watch video and play games on those systems. At the same time, vehicle controls are also highly customizable to individual driver or passengers, enabling a vehicle to store a seat position, a steering wheel position, mirror positions, radio stations, temperature settings, and the like for one or more users of the vehicle. These advancements have given rise to the development of "connected car" systems that communicate with "cloud" services and provide a high degree of vehicle customization for each occupant.

One major challenge with connected car solutions is personalization. Conventional systems either do no personalization (i.e., recognition of and automatic customization for each occupant) or require a user's explicit interaction in order to identify the user. In addition, if a vehicle has multiple displays for its IVI system, such as backseat entertainment system with multiple displays for each seat, further personalization is needed for each passenger in each seat. But, current vehicle IVI systems do not know "who sits where" automatically.

By way of example, there are smartphone services to enhance driver safety by limiting distractions, such as AT&T "Drive Mode" application. When the service detects the smartphone is in a moving car, the service puts the smartphone in a restricted mode. For example, in this mode, the user can only make emergency calls, but nothing else. However, the service cannot distinguish whether the smartphone is with the driver or the passenger. This causes inconveniences for passengers if their smartphones also run this service.

Also by way of example, without personalization, the IVI head unit may have the same settings (e.g., music channels, climate control, audio settings, saved destinations, etc.) for all drivers. This is inconvenient for family vehicles, which are often shared by both spouses and possibly children. Some vehicles store personal settings with the key, but the key is not a personal item for a particular person and usually there are only two keys. This is a particular problem for rental cars.

To enable complete personalization, some connected IVI systems ask for a PIN whenever the user enters a vehicle, thus authenticating the user and loading his personal preferences. This is inconvenient. There are other ways to authenticate the driver, such as by tapping near field communication (NFC) devices, fingerprint, and the like, but all require user interaction and effort. Bluetooth pairing may help identify a user automatically, but it requires pre-configuration for each vehicle, and cannot determine in which seat the user is located.

Therefore, there is a need in the art for improved methods and apparatuses for automatically personalizing vehicle controls and settings for each occupant. In particular, there is a need for an in-vehicle infotainment (IVI) system that automatically determines the seat location of an occupant and personalizes vehicle controls and settings according to that occupant's seat location, either at the driver seat or a particular passenger seat.

SUMMARY

To address the above-discussed deficiencies of the prior art, it is a primary object to provide a wireless mobile device for personalizing the control settings of a vehicle according to a seat position of a user of the mobile device, such as driver seat or any particular passenger seat. The wireless mobile device is configured to: i) receive a radio signal from each of a plurality of Bluetooth Low Energy (BLE) beacons in the vehicle; ii) determine a received signal strength indicator (RSSI) value for each received radio signal; iii) apply a seat prediction model M to the RSSI value for each received radio signal; and iv) transmit a predicted seat position P to a server.

In one embodiment, the wireless mobile device is further configured to receive from at least one beacon an identification (ID) value of the vehicle.

In another embodiment, the wireless mobile device is further configured to retrieve the identification (ID) value of the vehicle from the server by using the beacon's ID.

In another embodiment, the wireless mobile device retrieves the seat prediction model M from memory in the wireless mobile device.

In still another embodiment, the wireless mobile device is further configured to request the seat prediction model M from the server.

In yet another embodiment, the wireless mobile device is further configured to receive the seat prediction model M from the server.

It is another primary object to provide a server for personalizing the control settings of a vehicle according to a seat position of a user of a wireless mobile device. The server is configured to: i) receive from the wireless mobile device a request for a seat prediction model M corresponding to the vehicle, wherein the seat prediction model is based on previously-measured received signal strength indicator (RSSI) values of radio signals transmitted by each of a plurality of beacons in the vehicle; ii) in response to the request, transmit the seat prediction model M to the wireless mobile device; and iii) receive from the wireless mobile device a predicted seat position P.

In one embodiment, the server transmits the predicted seat position P to the vehicle.

In a further embodiment, the server transmits user profile information to the vehicle, the user profile information corresponding to a user of the wireless mobile device.

In yet another embodiment, the server transmits the user profile information to the vehicle in response to a request from the vehicle.

It is a further object to provide a system for personalizing the control settings of a vehicle according to a seat position of a user of a wireless mobile device. The system comprises: i) a plurality of beacons, each beacon configured to transmit a radio signal to the wireless mobile device; and ii) an in-vehicle infotainment (IVI) system configured to receive from a server a predicted seat position P of the user in the vehicle, wherein the predicted seat position P is based on previously-measured received signal strength indicator (RSSI) values of radio signals transmitted by the plurality of beacons.

In a further embodiment, the IVI system is further configured to receive from the server user profile information corresponding to the user of the wireless mobile device.

In a further embodiment, the wireless mobile device is further configured to personalize the behavior of the wireless mobile device according to where the user is seated in the vehicle. For example, the mobile device may be put in a restricted mode to reduce driver distraction if it is detected in driver seat.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an exemplary Bluetooth Low Energy (BLE) beacon according to one embodiment of the disclosure.

FIG. 3 illustrates exemplary omnidirectional and directional patterns of Bluetooth Low Energy (BLE) beacons according to one embodiment of the disclosure.

FIG. 4 illustrates an exemplary user interface showing a seating configuration of a vehicle according to one embodiment of the disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged connected car system and mobile phone.

The present disclosure provides a framework for automatically detecting the in-vehicle seat location for each occupant and personalizing vehicle controls accordingly. The framework includes the following features: i) a specially arranged Bluetooth Low Energy (BLE) beacon array inside the vehicle; ii) a set of calibrations easily performed by a user (typically the owner or the vehicle manufacturer) on his mobile device; iii) a set of methods to extend the calibration data to a wide range of real-world scenarios; iv) a set of smart machine learning algorithms to optimally determine the in-car vehicle location for each occupant, in a wide range of real-world scenarios; and v) a cloud-based infrastructure to facilitate the in-vehicle seat location for each occupant and enable further personalization.

Figure 1:
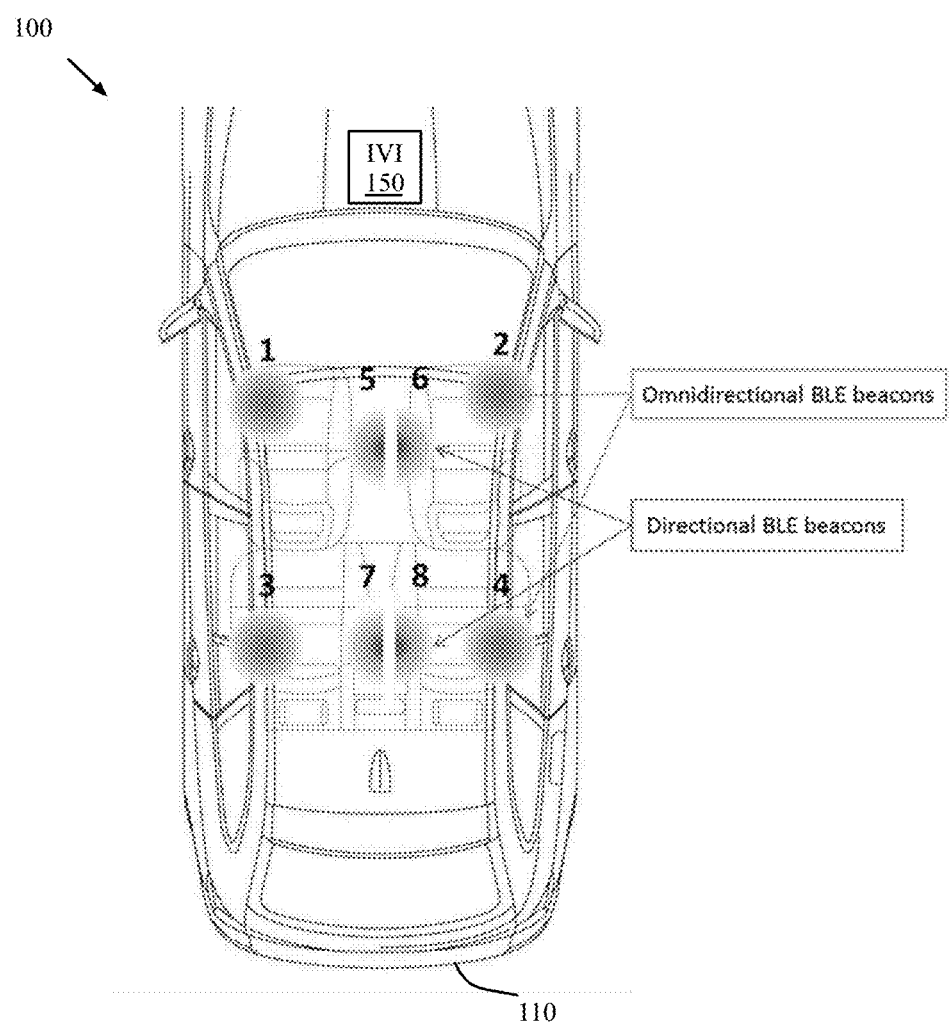
FIG. 1 illustrates an exemplary configuration of an in-vehicle infotainment (IVI) system and Bluetooth Low Energy (BLE) beacons according to one embodiment of the disclosure.

FIG. 1 illustrates exemplary configuration 100 of in-vehicle infotainment (IVI) system 150 and a plurality of Bluetooth Low Energy (BLE) beacons (BLEB1-BLEB8) in vehicle 110 according to one embodiment of the disclosure. IVI system 150 provides a vehicle with numerous advanced services, including high speed wireless access (e.g., 4G/LTE), advanced diagnostics, telematics, remote services, front passenger seat and/or rear seat "infotainment" (e.g., audio, video, Internet), voice recognition, automotive apps, and the like.

Bluetooth Low Energy (BLE) beacons BLEB1-BLEB8 are installed inside the vehicle 110. BLEB1, BLEB 2, BLEB3, and BLEB4 are omnidirectional beacons that radiate signals evenly in a 360 degree arc. In the exemplary configuration, BLEB1 is located in the front left corner of the passenger compartment, BLEB2 is located in the front right corner of the passenger compartment, BLEB3 is located in the rear left corner of the passenger compartment, and BLEB4 is located in the rear right corner of the passenger compartment.

BLEB5, BLEB 6, BLEB7, and BLEB8 are directional beacons that radiate signals primarily in one direction. In the exemplary configuration, BLEB5 is located in the front seat between the driver seat and front passenger set and radiates its signal primarily towards the driver seat. BLEB6 is also located in the front seat between the driver seat and front passenger seat, but BLEB6 radiates its signal primarily towards the front passenger seat. BLEB7 is located in the rear seat between the two rear passenger seats and radiates its signal primarily towards the rear left passenger seat. BLEB8 is also located between the two rear passenger seats, but BLEB8 radiates its signal primarily towards the rear right passenger seat.

According to the principles of the present disclosure, the mobile phone of a person sitting in vehicle 110 is configured to measure signals from all eight of the Bluetooth Low Energy (BLE) beacons (BLEB1-BLEB8), then apply a seat location prediction model M, described below, to detect the user's seat location, then report the seat location to a cloud server.

FIG. 2 illustrates exemplary directional Bluetooth Low Energy (BLE) beacon 200 according to one embodiment of the disclosure. Directional BLE beacon 200 comprises electromagnetic (EM) shield 205 and omnidirectional BLE beacon 210. EM shield 205 may comprise, for example, aluminum foil that acts as an electromagnetic shield to block one side of omnidirectional BLE beacon 210, as long as the radius of the foil is larger than the wavelength of the BLE signal (~12.5 cm). Alternatively, directional beacon can be manufactured in other form factors using other EM technologies, such as QUALCOMM Gimbal directional beacons.

BLE beacons 1-8 are low power consumption broadcasting devices with battery lives of two (2) years or longer. Each BLE beacon is a standalone device that periodically broadcasts data signals that includes the beacon identifier (ID) value as well as other optional data, such as a vehicle identifier (ID) value. Exemplary omnidirectional beacons may include Estimote beacons. Exemplary directional beacons may include QUALCOMM Gimbal directional beacons or modified omnidirectional beacons as described in FIG. 2.

FIG. 3 illustrates exemplary omnidirectional and directional patterns of Bluetooth Low Energy (BLE) beacons according to one embodiment of the disclosure. The exemplary signal patterns include omnidirectional 310, cardioid 320, supercardioid 330, hypercardioid 340, and bi-directional 350.

The actual layout of BLE beacons in vehicle 110 is flexible. In FIG. 1, the directional beacons are placed along the centerline of the vehicle and facing the seat. This is expected to create enough difference between left and right seats most of the time. At least one omnidirectional beacon is placed at a position reasonably away from the seats, such as the furthest corner. This is expected to act as an additional reference to further enhance the reliability. At each seat, the received signal strengths are expected to be different than at other seats.

The signal from each beacon may be observed at any location inside the vehicle, often with unpredictable noise, interference and fluctuations. Thus, at any in-vehicle location, a mobile device may receive all 8 BLE beacon signals. However, it is possible that, due to noise and interference, the signal from BLEB2, for example, received at the rear left seat may sometimes be stronger than that from BLEB3, although most of time it is expected to be weaker. Therefore, there is no simple threshold to reliably determine the in-car location of the mobile device from the received signal strength indicators (RSSIs). However, a machine learning process according to the principles of the disclosure filters out noise. The present disclosure describes methods and apparatuses that use all the beacon signals collectively and intelligently to determine reliably the in-vehicle location of a user and his or her mobile device.

FIG. 4 illustrates exemplary user interface (UI) 400 of a calibration application showing a seating configuration of a vehicle according to one embodiment of the disclosure. To begin the process of developing a seat prediction model M of vehicle 110, a mobile phone user, typically the owner of the vehicle or the manufacturer, launches an application on the mobile phone that displays UI 400. The user then selects one of front left (FL), front right (FR), rear left (RL), or rear right (RR), depending on the seat in which the user is located. Once a seat has been selected, the mobile phone begins to continuously record the received signal strength indicator (RSSI) for each BLE beacon. During the recording, the user may move the mobile phone around in the same manner as he usually would do when seated. The recording can continue for a short period of time, such as half minute. Then the user can stop the recording process for that seat using the UI 400. The user repeats this recording process for each seat.

Figure 5:
FIG. 5 illustrates an exemplary set of collected data for eight Bluetooth Low Energy (BLE) beacons measured for one seat position according to one embodiment of the disclosure.

The disclosed mobile device and related methods do not require any prior knowledge about the location or broadcasting power of each BLE beacon. Instead, the disclosed technique collects BLE beacon calibration data using the personal mobile device of the user (e.g., smartwatch, smartphone, pad device, laptop, and the like). For example, if a user mobile device records the beacon signals from each of the four seat locations (front-left, front-right, rear-left, rear-right) in vehicle 110, one entry of the data collected by the application on the mobile device may look like the data in FIG. 5. FIG. 5 illustrates exemplary data set 500 of collected data for eight Bluetooth Low Energy (BLE) beacons measured at one moment for one seat position, namely, front left (FL) according to one embodiment of the disclosure. Data set 500 is essentially a sample of electronic signature for the 8 BLE beacons as seen in the front left seat at a certain moment. This signature will be continuously sampled at a fixed interval during the recording process, such as once per second for 30 seconds. Once the signature is sufficiently sampled, a data generalization and machine learning process will be used to filter out noises and find the signature for that seat. The electronic signatures in the each of the four seats will be different. Together, the electronic signatures for all four seats comprise a seat prediction model M.

Thus, the data collection process performed by the user and the mobile device of the user may be summarized as follows: i) the user holds the mobile device and occupies one seat in vehicle 110; ii) the user clicks one of the buttons (FL, FR, RL, and RR) on the mobile device UI 400, as shown in FIG. 4. The button corresponds to the seat occupied by the user; iii) the data collection application records all beacon signal strength values (i.e., RSSI values) periodically (e.g., once per second); iv) each recorded data entry consists of a signal strength value from each BLE beacon (e.g., eight values as in FIG. 5). The data entry is also labeled with the current seat location (e.g., FL); v) during the data recording, the user moves the mobile device around or puts the mobile device in a pocket, as the user normally would do when seated.

Each recording may last about 30 seconds. Then the user stops the current recording on the mobile device and repeats the process for all of the other seats in vehicle 110. Preferably, multiple rounds of data collection may be repeated to increase the data size. The disclosed technique may also record data when the user is just outside of vehicle 110.

Figure 6:
FIG. 6 illustrates an exemplary data table for multiple sets of collected data for multiple seat positions according to one embodiment of the disclosure.

FIG. 6 illustrates exemplary data table 600 for multiple sets of collected data for multiple seat positions according to one embodiment of the disclosure. The first entry is the same as data set 500 from FIG. 5 for the FL seat. The process is repeated at a fixed interval (e.g., once per second) for the front left seat, so that a list of data entries are collected and filled into data table 600 for the FL seat, one row per second. So, if the recording time is 30 seconds and the interval is one second, the FL seat will record 30 rows in total. The process is then repeated for the remaining seats (FR, RL, RR) until data table 600 is complete.

Preferably, the data collection process collects enough data to cover all possible scenarios of interference and noise caused by the user or other elements. Some typical scenarios may include: i) another user may carry a different mobile device, such as a different model of smartphone, or put the smartphone in a cover case or handbag, which may cause a different sensitivity of its BLE antenna; ii) there may be multiple occupants in the car. The human body absorbs and attenuates BLE signals or alters the travel paths of the BLE signals; iii) longer durations for data collection. The data collected is a time series of discrete samples. The longer the data collection period, the more variation of the data that will be captured in the time series; iv) the BLE beacon may degrade after a period of usage, such as reduced performance or power; and v) the BLE beacon may be displaced a little bit from its original installation position, such as by vehicle vibration.

In practice, however, it is very unlikely or even impossible for a typical vehicle owner or manufacturer to collect data for all those scenarios. Therefore, there is a need to automatically generate simulated data to maximally cover those scenarios, based on the data recorded in a relatively short period of time using a single mobile device. The disclosed system and method generalizes the data collected to include the following scenarios: i) various BLE antenna sensitivities. The disclosed system generates new data entries by scaling the raw data entry by a factor. Thus, the disclosed technique may simulate either a less or a more sensitive BLE antenna on the mobile device; ii) multiple occupants. For each seat, the disclosed system may attenuate the RSSI from the beacons associated with other seats, thus simulating the absorption by the human body of the BLE signal when other seats are occupied; iii) longer recording time. In addition to the raw data collection, the disclosed system may increase the data size and coverage by randomly shuffling the time series of raw data for each seat and then appending to the data set for that seat. Thus, the disclosed system may simulate a longer data collection time; and iv) various BLE beacon noises. The disclosed system may simulate BLE beacon noises by adding a random value to the raw recorded data entry to generate a new data entry To achieve the best robustness, the disclosed system may apply a sliding window to data table 600 for each seat. By way of example, a sliding window of size 3 may concatenate the first three rows from table 600 (FL1, FL2, FL3) for the FL seat into a single entry in a new table 600. The sliding window then concatenates the next three data sets (FL2, FL3, FL4) for the FL seat into the next single entry in the new table 600. The sliding window continues for all remaining FL seat data sets before repeating the process for the other seats, thus generates a generalized data table 600.

The generalized data table 600 is a labeled training data set ready for machine learning. In an exemplary embodiment of the disclosure, a seat prediction model M learned from the training data set will be used to predict a user seat location based on a time series of BLE signal samples, i.e. the sliding window. The generalized data table 600 is processed by automatic classifiers using existing machine learning algorithms. A classifier will be trained using the training data, for example, the generalized data table 600 with BLE measurements and labels (FL, FR, RL, RR), until it learns how to label new measurements automatically and accurately. The two most widely used "off-the-shelf" classifiers are Support Vector Machine (SVM) and Random Forest (RF). Both well-known classifiers have similar performance with little manual adjustment. Additional information may be found at:
Support Vector Machine—
http://en.wikipedia.org/wiki/Support_vector_machine
Random Forest—http://en.wikipedia.org/wiki/Random_forest After the classifier (SVM, RF, or other) processes or learns the generalized data table 600, the classifier generates a seat prediction model M with accuracy of prediction. The seat prediction model M is later applied to new data, e.g. a new window of 3 consecutive BLE measurements, then output a new seat position P. The accuracy will usually reach 98% to 100% using the above-described data generalization techniques. The longer the sliding window that is used, the greater the accuracy that may be achieved, but with increased latency. An acceptable trade-off may be chosen, depending on the requirements of an application.

Figure 7:
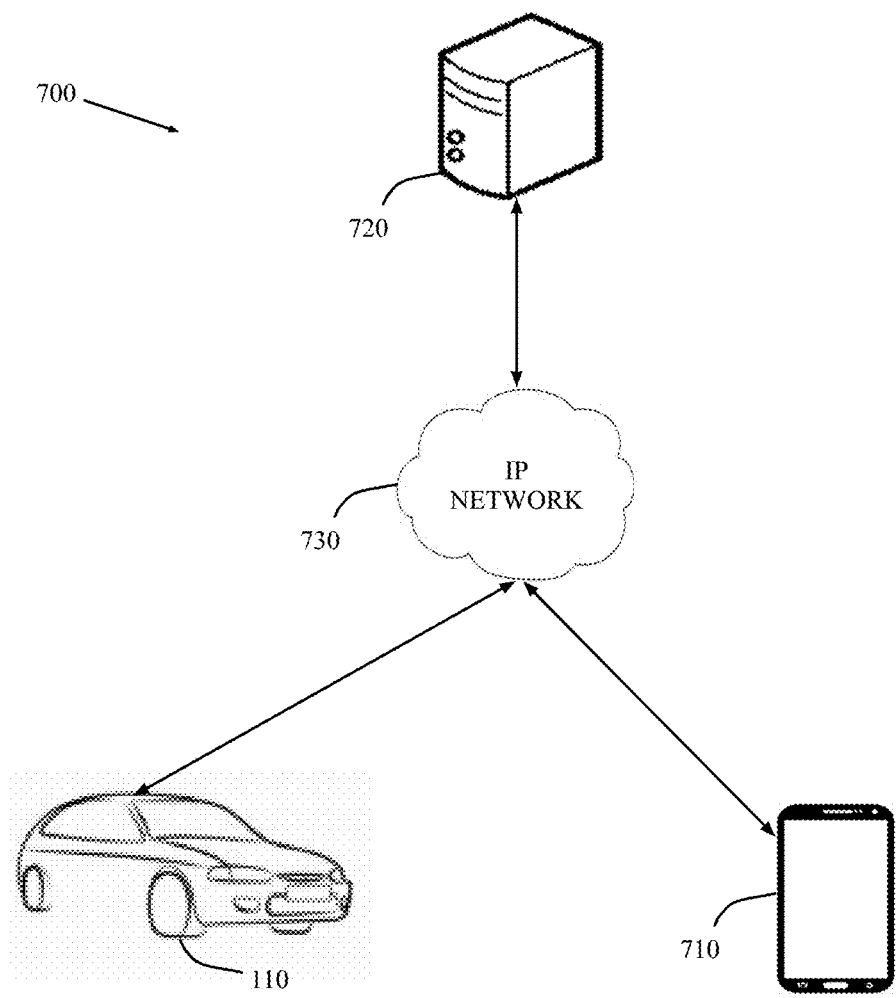
FIG. 7 illustrates an exemplary network topography for providing in-vehicle personalized settings according to one embodiment of the disclosure.
Figure 8:
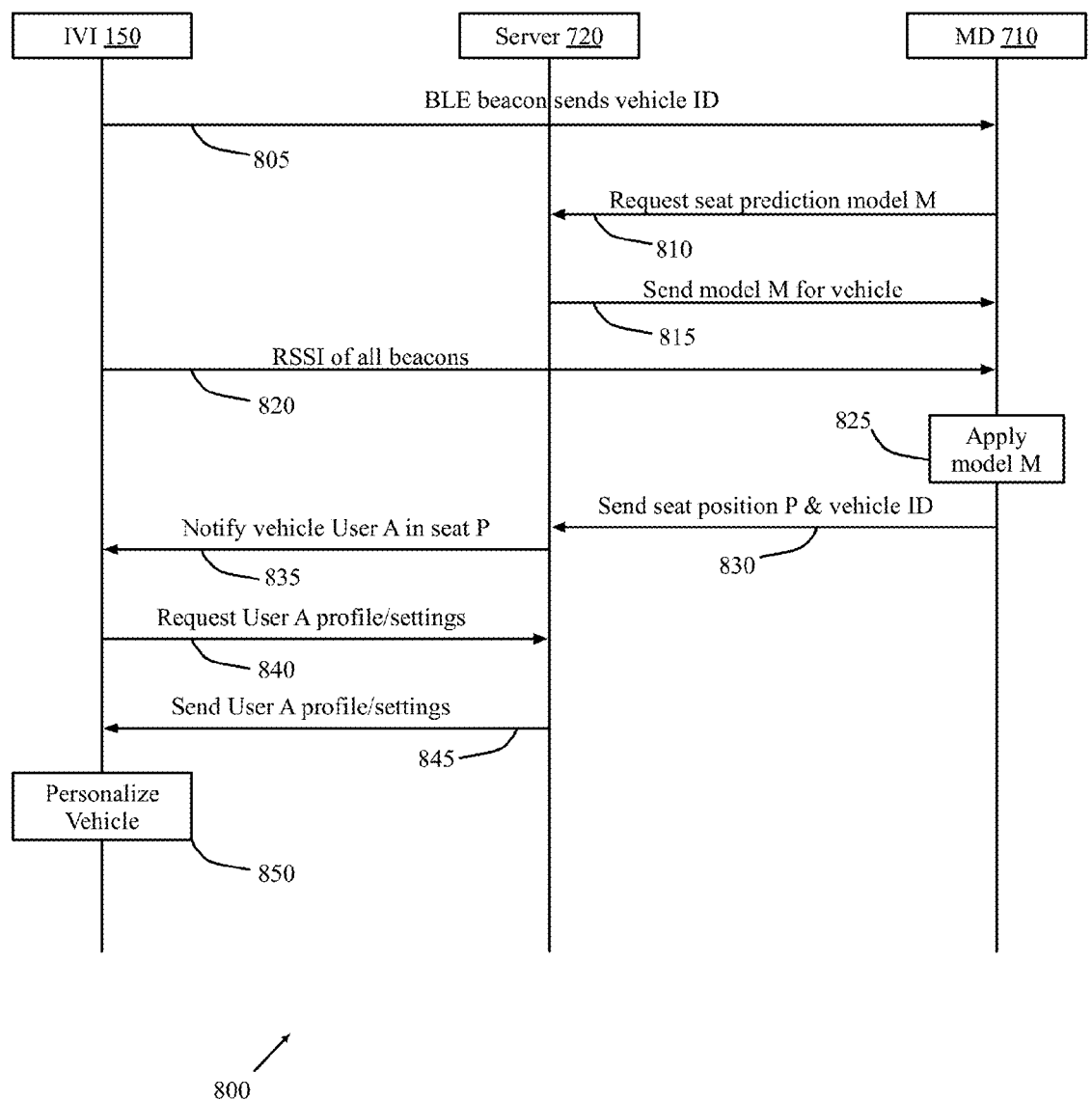
FIG. 8 is a flow diagram illustrating in-vehicle personalization according to one embodiment of the disclosure.

FIG. 7 illustrates exemplary network topography 700 for providing in-vehicle personalized settings according to one embodiment of the disclosure. FIG. 8 depicts flow diagram 800, which illustrates in-vehicle personalization according to one embodiment of the disclosure. Cloud server 720 may be accessed by and communicate with IVI system 150 in vehicle 110 and mobile device 710 associated with a user or passenger in vehicle 710. Server 720 communicates wirelessly with IVI system 150 and mobile device 710 via an Internet protocol (IP) network 730, such as the Internet. Once the seat prediction model M for vehicle 110 is determined by the owner or manufacturer, the seat prediction model M is uploaded and stored in a cloud server 720 in a record associated with the vehicle ID of vehicle 110 and downloaded when requested by any registered user. The downloaded model M can be cached in mobile device 710 for repeated use in the near future. The disclosed system enables new passengers and rental car users to receive on-demand personalized services even if the registered user and mobile device have no prior knowledge about vehicle 110.

In FIG. 8, BLE beacons BLEB1-BLEB8 associated with IVI system 150 in vehicle 110 periodically broadcast BLE beacon signals with beacon IDs to user mobile device (MD) 710 (step 805). MD 710 can then retrieve the vehicle 110 ID from the cloud server using the beacon IDs. Alternatively, the BLE beacon signal can be configured to broadcast the vehicle 110 ID directly to MD 710. When MD 710 obtains the vehicle 110 ID, MD 710 transmits to server 720 a request for the seat prediction model M for vehicle 110 (step 810). In response, server 720 retrieves the previously stored seat prediction model M for vehicle 110 and transmits model M to MD 710 (step 815). Thereafter, MD 710 measures the RSSI values of the eight BLE beacon signals transmitted by BLEB1-BLEB8 (step 820). After MD 710 determines the RSSI values, MD 710 applies the seat prediction model M to the measured RSSI values in a sliding window to predict the seat position P of the user operating MD 710 (step 825).

Next, MD 710 transmits to server 720 the predicted seat position P and the ID of vehicle 110 (step 830). In response, server 720 notifies IVI 150 in vehicle 110 that User A (operator of MD 710) is located in seat P of vehicle 110 (step 835). IVI 150 then requests User A profile and settings information (e.g., music lists, websites, videos, and the like) from server 720 (step 840). Server 720 then downloads to IVI system 150 the requested User A profile and settings information (step 845). Finally, IVI system 150 personalizes vehicle 110 according to the downloaded User A profile and settings (step 850).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless mobile device for personalizing one or more control settings of a vehicle according to a seat position of a user of the wireless mobile device in the vehicle, wherein the wireless mobile device is configured to:
receive a radio signal from each of a plurality of beacons in the vehicle;

determine a received signal strength indicator (RSSI) value for each received radio signal;

apply a seat prediction model M to the RSSI value for each received radio signal; and transmit a predicted seat position P of the user to a server, wherein the predicted seat position P from the wireless mobile device is configured to cause the one or more control settings of the vehicle to change.

2. The wireless mobile device as set forth in claim 1, wherein the wireless mobile device is further configured to receive from at least one beacon an identification (ID) value of the vehicle.

3. The wireless mobile device as set forth in claim 1, wherein the wireless mobile device is further configured to receive an identification (ID) value of the vehicle from the server using at least one identification (ID) value associated with at least one of the beacons.

4. The wireless mobile device as set forth in claim 1, wherein the wireless mobile device retrieves the seat prediction model M from a memory in the wireless mobile device.

5. The wireless mobile device as set forth in claim 1, wherein the wireless mobile device is further configured to request the seat prediction model M from the server.

6. The wireless mobile device as set forth in claim 5, wherein the wireless mobile device is further configured to receive the seat prediction model M from the server.

7. A method in a wireless mobile device for personalizing one or more control settings of a vehicle according to a seat position of a user of the wireless mobile device in the vehicle, the method comprising:

receiving a radio signal from each of a plurality of beacons in the vehicle;

determining a received signal strength indicator (RSSI) value for each received radio signal;

applying a seat prediction model M to the RSSI value for each received radio signal; and transmitting a predicted seat position P of the user to a server, wherein the predicted seat position P from the wireless mobile device is configured to cause the one or more control settings of the vehicle to change.

8. The method as set forth in claim 7, further comprising receiving from at least one beacon an identification (ID) value of the vehicle.

9. The method as set forth in claim 7, further comprising retrieving the seat prediction model M from a memory in the wireless mobile device.

10. The method as set forth in claim 7, further comprising requesting the seat prediction model M from the server.

11. The method as set forth in claim 10, further comprising receiving the seat prediction model M from the server.

12. A server for personalizing one or more control settings of a vehicle according to a seat position of a user of a wireless mobile device in the vehicle, wherein the server is configured to:

receive from the wireless mobile device a request for a seat prediction model M corresponding to the vehicle, wherein the seat prediction model M is based on previously-measured received signal strength indicator (RSSI) values of radio signals transmitted to the wireless mobile device by each of a plurality of beacons in the vehicle;

in response to the request, transmit the seat prediction model M to the wireless mobile device; and receive from the wireless mobile device a predicted seat position P of the user, wherein the predicted seat position P from the wireless mobile device is configured to cause the one or more control settings of the vehicle to change.

13. The server as set forth in claim 12, wherein the server transmits the predicted seat position P to the vehicle.

14. The server as set forth in claim 12, wherein the server transmits user profile information to the vehicle, the user profile information corresponding to a user of the wireless mobile device.

15. The server as set forth in claim 14, wherein the server transmits the user profile information to the vehicle in response to a request from the vehicle.

16. A method in a server for personalizing one or more control settings of a vehicle according to a seat position of a user of a wireless mobile device in the vehicle, the method comprising:

receiving from the wireless mobile device a request for a seat prediction model M corresponding to the vehicle, wherein the seat prediction model is based on previously-measured received signal strength indicator (RSSI) values of radio signals transmitted by each of a plurality of beacons in the vehicle;

in response to the request, transmitting the seat prediction model M to the wireless mobile device; and receiving from the wireless mobile device a predicted seat position P of the user, wherein the predicted seat position P from the wireless mobile device is configured to cause the one or more control settings of the vehicle to change.

17. The method as set forth in claim 16, further comprising transmitting the predicted seat position P to the vehicle.

18. The method as set forth in claim 16, further comprising transmitting user profile information to the vehicle, the user profile information corresponding to a user of the wireless mobile device.

19. The method as set forth in claim 18, wherein transmitting the user profile information to the vehicle is in response to a request from the vehicle.

20. A system for personalizing one or more control settings of a vehicle according to a seat position of a user of a wireless mobile device in the vehicle, the system comprising:

a plurality of beacons, each beacon configured to transmit a radio signal to the wireless mobile device; and an in-vehicle infotainment (IVI) system configured to receive from a server a predicted seat position P of the user in the vehicle from the wireless mobile device, wherein the predicted seat position P is based on previously-measured received signal strength indicator (RSSI) values of radio signals transmitted by the plurality of beacons, and the predicted seat position P from the wireless mobile device is configured to cause the one or more control settings of the vehicle to change.

21. The system as set forth in claim 20, wherein the WI system is further configured to receive from the server user profile information corresponding to the user of the wireless mobile device.

22. A method of personalizing one or more control settings of a vehicle according to a seat position of a user of a wireless mobile device in the vehicle, the method comprising:

transmitting a radio signal from each of a plurality of beacons to the wireless mobile device; and in an in-vehicle infotainment (IVI) system, receiving from a server a predicted seat position P of the user in the vehicle from the wireless mobile device, wherein the predicted seat position P is based on previously-measured received signal strength indicator (RSSI) values of radio signals transmitted by the plurality of beacons, and the predicted seat position P from the wireless mobile device is configured to cause the one or more control settings of the vehicle to change.

23. The method as set forth in claim 22, further comprising receiving from the server user profile information corresponding to the user of the wireless mobile device.

24. The wireless mobile device as set forth in claim 1, wherein the predicted seat position P from the wireless mobile device is configured to cause the one or more control settings of the vehicle to change automatically.

\* \* \* \* \*